(12) United States Patent
Endo et al.

(10) Patent No.: US 9,040,439 B2
(45) Date of Patent: May 26, 2015

(54) OPTICAL GLASS, OPTICAL ELEMENT, AND METHOD FOR MANUFACTURING OPTICAL GLASS

(71) Applicants: THE UNIVERSITY OF TOKYO, Tokyo (JP); CANON KABUSHIKI KAISHA, Tokyo (JP)

(72) Inventors: Michio Endo, Utsunomiya (JP); Shingo Eguchi, Utsunomiya (JP); Hiroyuki Inoue, Tokyo (JP); Atsunobu Masuno, Tokyo (JP)

(73) Assignees: Canon Kabushiki Kaisha, Tokyo (JP); The University of Tokyo, Tokyo (JP)

( * ) Notice: Subject to any disclaimer, the term of this patent is extended or adjusted under 35 U.S.C. 154(b) by 0 days.

(21) Appl. No.: 14/190,387

(22) Filed: Feb. 26, 2014

(65) Prior Publication Data
US 2014/0256531 A1 Sep. 11, 2014

(30) Foreign Application Priority Data
Mar. 8, 2013 (JP) .................................. 2013-046908

(51) Int. Cl.
| | |
|---|---|
| *C03C 3/15* | (2006.01) |
| *C03C 3/155* | (2006.01) |
| *C03C 3/068* | (2006.01) |
| *C03B 19/00* | (2006.01) |
| *C03C 3/253* | (2006.01) |
| *C03B 40/04* | (2006.01) |
| *C03B 19/10* | (2006.01) |

(52) U.S. Cl.
CPC .................. *C03C 3/253* (2013.01); *C03B 19/00* (2013.01); *C03C 3/068* (2013.01); *C03C 3/15* (2013.01); *C03C 3/155* (2013.01); *C03B 40/04* (2013.01); *C03B 19/1035* (2013.01); *C03B 19/1055* (2013.01); *C03B 2215/48* (2013.01)

(58) Field of Classification Search
CPC ............ C03C 3/068; C03C 3/15; C03C 3/155
See application file for complete search history.

(56) References Cited

U.S. PATENT DOCUMENTS

| | | |
|---|---|---|
| 8,202,813 B2 | 6/2012 | Nakata et al. |
| 8,338,003 B2 | 12/2012 | Nakata et al. |
| 8,492,298 B2 | 7/2013 | Yamamoto et al. |
| 2010/0081561 A1 | 4/2010 | Nakata et al. |
| 2011/0263410 A1 | 10/2011 | Negishi et al. |

FOREIGN PATENT DOCUMENTS

WO 2010/053214 A1 5/2010

*Primary Examiner* — Anthony J Green
*Assistant Examiner* — Elizabeth A Bolden
(74) *Attorney, Agent, or Firm* — Fitzpatrick, Cella, Harper & Scinto

(57) ABSTRACT

An optical glass including $B^{3+}$, $La^{3+}$ and $Nb^{5+}$ as cationic components constituting the glass, wherein the optical glass satisfies the following expressions represented in cation percentages:
10 cat. % ≤ $B^{3+}$ ≤ 50 cat. %;
40 cat. % ≤ $La^{3+}$ ≤ 65 cat. %;
0 cat. % ≤ $Nb^{5+}$ ≤ 40 cat. %;
80 cat. % ≤ (total amount of $B^{3+}+La^{3+}+Nb^{5+}$) ≤ 100 cat. %; and
0 cat. % ≤ $Si^{4+}$ ≤ 10 cat. %;
0 cat. % ≤ $Ge^{4+}$ ≤ 5 cat. %;
0 cat. % ≤ $Mg^{2+}$ ≤ 5 cat. %;
0 cat. % ≤ $Ba^{2+}$ ≤ 10 cat. %;
0 cat. % ≤ $Ca^{2+}$ ≤ 10 cat. %;
0 cat. % ≤ $Sr^{2+}$ ≤ 10 cat. %;
0 cat. % ≤ $Zn^{2+}$ ≤ 20 cat. %;
0 cat. % ≤ $W^{6+}$ ≤ 5 cat. %;
0 cat. % ≤ $Zr^{4+}$ ≤ 5 cat. %;
0 cat. % ≤ $Ti^{4+}$ ≤ 5 cat. %;
0 cat. % ≤ $Bi^{3+}$ ≤ 5 cat. %;
0 cat. % ≤ $Ta^{5+}$ ≤ 10 cat. %;
0 cat. % ≤ (total amount of $Y^{3+}+Gd^{3+}$) ≤ 20 cat. %; and
0 cat. % ≤ (total amount of $Yb^{3+}+Lu^{3+}$) ≤ 10 cat. %.

11 Claims, 2 Drawing Sheets

OPTICAL GLASS, OPTICAL ELEMENT, AND METHOD FOR MANUFACTURING OPTICAL GLASS

BACKGROUND OF THE INVENTION

1. Field of the Invention

The present invention relates to an optical glass which contains a high proportion of rare earth ions and an optical element such as a lens obtained by forming the optical glass.

2. Description of the Related Art

As a high refractive index, low dispersion glass, a rare earth borate glass is known. In general, a high refractive index glass has high dispersion, while a low refractive index glass has low dispersion. An increased content of rare earths, however, allows a glass to have an increased refractive index while maintaining low dispersion. Examples of the glass with a high content of rare earths include glass disclosed in WO2010/053214, having a total content of $La^{3+}$, $Gd^{3+}$, $Y^{3+}$, $Sc^{3+}$ and $Lu^{3+}$ of 15 to 50%.

The glass composition specifically disclosed in WO2010/053214, however, has a maximum content of rare earths of 38.8 cat. %, merely achieving a refractive index nd of 1.88 and an Abbe number of vd of 41.2. Accordingly, there still exists a problem of difficulty in producing a high refractive index, low dispersion glass.

SUMMARY OF THE INVENTION

The present invention was devised in the light of these background art. It is an object of the present invention to provide a glass having a refractive index nd of 1.90 or more and low dispersion. Another object is to provide a method for manufacturing the glass.

The present invention relates to an optical glass including $B^{3+}$, $La^3$ and $Nb^5$ as cationic components constituting the glass, wherein the optical glass satisfies the following expressions represented in cation percentages:

10 cat. % ≤ $B^{3+}$ ≤ 50 cat. %;
40 cat. % ≤ $La^{3+}$ ≤ 65 cat. %;
0 cat. % ≤ $Nb^{5+}$ ≤ 40 cat. %;
80 cat. % ≤ (total amount of $B^{3+}$+$La^{3+}$+$Nb^{5+}$) ≤ 100 cat. %; and
0 cat. % ≤ $Si^{4+}$ ≤ 10 cat. %;
0 cat. % ≤ $Ge^{4+}$ ≤ 5 cat. %;
0 cat. % ≤ $Mg^{2+}$ ≤ 5 cat. %;
0 cat. % ≤ $Ba^{2+}$ ≤ 10 cat. %;
0 cat. % ≤ $Ca^{2+}$ ≤ 10 cat. %;
0 cat. % ≤ $Sr^{2+}$ ≤ 10 cat. %;
0 cat. % ≤ $Zn^{2+}$ ≤ 20 cat. %;
0 cat. % ≤ $W^{6+}$ ≤ 5 cat. %;
0 cat. % ≤ $Zr^{4+}$ ≤ 5 cat. %;
0 cat. % ≤ $Ti^{4+}$ ≤ 5 cat. %;
0 cat. % ≤ $Bi^{3+}$ ≤ 5 cat. %;
0 cat. % ≤ $Ta^{5+}$ ≤ 10 cat. %;
0 cat. % ≤ (total amount of $Y^{3+}$+$Gd^{3+}$) ≤ 20 cat. %; and
0 cat. % ≤ (total amount of $Yb^{3+}$+$Lu^{3+}$) ≤ 10 cat. %.

Alternatively, the present invention relates to an optical glass including $B^{3+}$ and $La^{3+}$ as cationic components constituting the glass, wherein the optical glass satisfies the following expressions represented in cation percentages:

10 cat. % ≤ $B^{3+}$ ≤ 50 cat. %;
40 cat. % ≤ $La^{3+}$ ≤ 63 cat. %;
0 cat. % = $Nb^{5+}$;
0 cat. % ≤ $Si^{4+}$ ≤ 10 cat. %;
0 cat. % ≤ $Ge^{4+}$ ≤ 5 cat. %;
0 cat. % ≤ $Mg^{2+}$ ≤ 5 cat. %;
0 cat. % ≤ $Ba^{2+}$ ≤ 10 cat. %;
0 cat. % ≤ $Ca^{2+}$ ≤ 10 cat. %;
0 cat. % ≤ $Sr^{2+}$ ≤ 10 cat. %;
0 cat. % ≤ $Zn^{2+}$ ≤ 20 cat. %;
0 cat. % ≤ $W^{6+}$ ≤ 5 cat. %;
0 cat. % ≤ $Zr^{4+}$ ≤ 5 cat. %;
0 cat. % ≤ $Ti^{4+}$ ≤ 5 cat. %;
0 cat. % ≤ $Bi^{3+}$ ≤ 5 cat. %;
0 cat. % ≤ $Ta^{5+}$ ≤ 10 cat. %;
0 cat. % ≤ (total amount of $Y^{3+}$+$Gd^{3+}$) ≤ 20 cat. %; and
0 cat. % ≤ (total amount of $Yb^{3+}$+$Lu^{3+}$) ≤ 10 cat. %.

The present invention also relates to a method for manufacturing an optical glass by a containerless solidification method, including the steps of levitating a glass material containing 40 cat. % or more and 65 cat. % or less of $La^{3+}$ represented in cation percentage with a levitating gas, heat melting the levitated glass material to produce a fused material, and cooling and solidifying the fused material in a levitated state.

The present invention provides a transparent glass sphere having a refractive index nd for the d-line (587.56 nm) of 1.90 or more.

Further features of the present invention will become apparent from the following description of exemplary embodiments with reference to the attached drawings.

DESCRIPTION OF THE EMBODIMENTS

Figure 1:
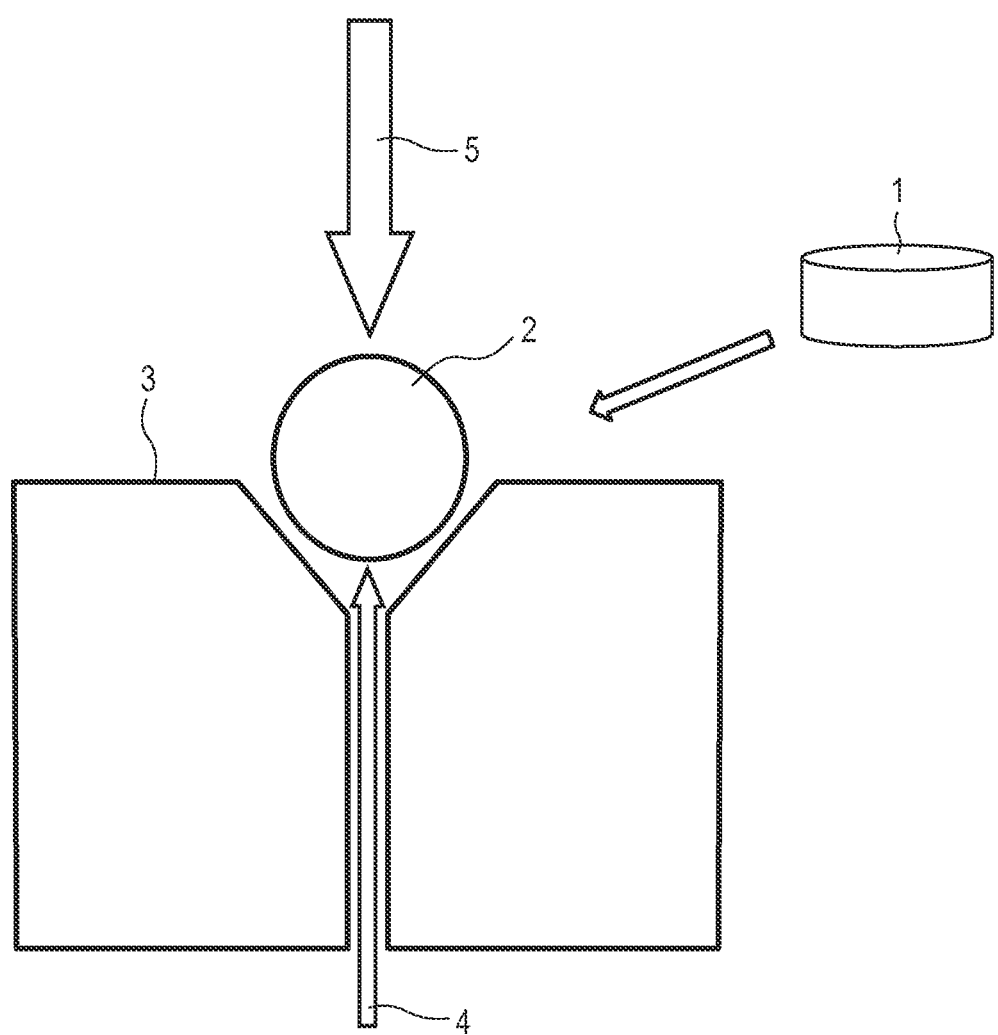
FIG. 1 is a diagram illustrating a gas jet levitating apparatus for use in Examples.

Preferred embodiments of the present invention will now be described in detail in accordance with the accompanying drawings.

(Optical Glass)

The glass (optical glass) of the present invention includes $B^{3+}$ and $La^{3+}$, and optionally $Nb^{5+}$ as cationic components. The proportion of total amount of these cationic components in the optical glass is high. The glass of the present invention is transparent and has a high refractive index.

The glass of the present invention includes $B^{3+}$ in a proportion (represented in cation percentages) of 10 cat. % or more and 50 cat. % or less with respect to the whole cationic components contained in the glass. The $B^{3+}$ in the glass functions as a glass network former, stabilizing the glass and imparting low dispersion. A content of $B^{3+}$ of less than 10 cat. % causes the glass to be unstabilized, while a content of $B^{3+}$ of more than 50 cat. % causes reduction in the refractive index. In both cases, a high refractive index, low dispersion glass may not be obtained. Furthermore, a high content of $B^{3+}$ causes fine bubbles in the glass, resulting in defects for use as an optical element.

In the present invention, the cation percentage (cat. %) represents the proportion of the number of cations for a particular cationic species in the total number of the cations such as $B^{3+}$, $La^{3+}$ and $Nb^{5+}$. For example, in the case of cationic components including $B^{3+}$, $La^{3+}$ and $Nb^{5+}$ only, the cation percentage of $La^{3+}$ is the proportion of the number of cations of $La^{3+}$ in the total number of cations of $B^{3+}$, $La^{3+}$ and $Nb^{5+}$ as shown in the following expression:

Cation percentage of $La^{3+}$=(number of $La^{3+}$ cations)/ ((number of $B^{3+}$ cations)+(number of $La^{3+}$ cations)+(number of $Nb^{5+}$ cations))×100

The glass of the present invention includes $Nb^{5+}$ in a proportion of 0 cat. % or more and 40 cat. % or less with respect to the whole cationic components contained in the glass. The $Nb^{5+}$ in the glass functions as a glass network former, imparting a high refractive index in particular. A content of $Nb^{5+}$ of more than 40 cat. % causes the glass to be unstabilized and crystallized (devitrified).

The glass of the present invention, in the case of including $Nb^{5+}$, includes $La^{3+}$ which is a rare earth ion in a proportion of 40 cat. % or more and 65 cat. % or less, preferably 50 cat. % or more and 65 cat. % or less, more preferably 54 cat. % or more and 65 cat. % or less, with respect to the whole cationic components contained in the glass. A content of $La^{3+}$ of less than 40 cat. % allows no high refractive index, low dispersion glass to be obtained, while a content of $La^{3+}$ of more than 65 cat. % causes the glass to be unstabilized and crystallized (devitrified). A content of $La^{3+}$ of 50 cat. % or more and 65 cat. % or less, more preferably 54 cat. % or more and 65 cat. % or less, allows the melt glass to be hardly deformed due to an increased melt viscosity, so that a glass sphere having a diameter of 5 mm or more may be manufactured.

The glass of the present invention, in the case of not including $Nb^{5+}$, preferably includes $La^{3+}$ in a proportion of 40 cat. % or more and 63 cat. % or less, more preferably 50 cat. % or more and 63 cat. % or less. In the case of a content of $La^{3+}$ of less than 40 cat. %, it is difficult to obtain the high refractive index, low dispersion glass, while a content of $La^{3+}$ of more than 63 cat. % causes the glass to be easily unstabilized and crystallized (devitrified).

The glass of the present invention has a proportion of the total of $B^{3+}$, $La^{3+}$ and $Nb^{5+}$ of 80 cat. % or more and 100 cat. % or less with respect to the whole of cationic components of the glass. A proportion of the total of these ions of less than 80 cat. % causes reduction in transparency.

In order to obtain a high refractive index glass, the following expressions can be satisfied: $La^{3+}/2 \leq (B^{3+}+Nb^{5+})$ and 4.8 cat. $\% \leq Nb^{5+}$.

In order to obtain a large aperture lens of stable glass, the following expression can be satisfied: $B^{3+} \leq La^{3+}$ and 4.8 cat. $\% \leq Nb^{5+}$.

The glass of the present invention may include the following cationic components as optional components. The proportions of the respective optional components represent the proportions with respect to the whole cationic components contained in the glass.

The glass of the present invention may include $Si^{4+}$ in a proportion of 0 cat. % or more and 10 cat. % or less. A content of $Si^{4+}$ of more than 10 cat. % in the glass causes the glass to be unstabilized and to have a high melting point.

The glass of the present invention may include $Ge^{4+}$ in a proportion of 0 cat. % or more and 5 cat. % or less. A content of $Ge^{4+}$ of more than 5 cat. % in the glass causes the glass to be unstabilized.

The glass of the present invention may include $Mg^{2+}$ in a proportion of 0 cat. % or more and 5 cat. % or less, and any one or more of $Ba^{2+}$, $Ca^{2+}$ and $Sr^{2+}$ in a proportion of 0 cat. % or more and 10 cat. % or less for each ion. These cationic components in the glass have an effect for lowering the glass transition temperature. A content of $Mg^{2+}$ of more than 5 cat. %, or a content of any one of $Ba^{2+}$, $Ca^{2+}$+ and $Sr^{2+}$ of more than 10 cat. % causes the glass to be unstabilized.

The glass of the present invention may include $Zn^{2+}$ in a proportion of 0 cat. % or more and 20 cat. % or less. $Zn^{2+}$ in the glass has an effect for lowering the glass transition temperature. With a content of $Zn^2$ of more than 20 cat. %, $Zn^{2+}$ does not function as a network former, causing the glass to be unstabilized.

The glass of the present invention may include $W^{6+}$, $Zr^{4+}$, $Ti^{4+}$ and $Bi^{3+}$ in a proportion of 0 cat. % or more and 5 cat. % or less. $W^{6+}$, $Ti^{4+}$ and $Bi^{3+}$ in the glass have a function for imparting a high refractive index and vitrification stability. A content of any one of $W^{6+}$, $Ti^{4+}$ and $Bi^{3+}$ of more than 5 cat. % causes the glass not to maintain low dispersion and results in reduction in internal transmittance. $Zr^{4+}$ in the glass has a function for stabilizing the glass. $Zr^{4+}$ with a content of more than 5 cat. % functions as a crystal nucleus, causing the glass to be unstabilized.

The glass of the present invention may include $Ta^{5+}$ in a proportion of 0 cat. % or more and 10 cat. % or less. Compared to $Nb^{5+}$, $Ta^{5+}$ in the glass is capable of maintaining a high refractive index while achieving low dispersion, allowing the glass to be stabilized. A content of $Ta^{5+}$ of more than 10 cat. % causes the glass to be unstabilized, resulting in crystal deposition.

The glass of the present invention may include any one or more of $Sb^{3+}$, $Sn^{4+}$ and $Sn^{2+}$ in a proportion of 0 cat. % or more and 1 cat. % or less. $Sb^{3+}$, $Sn^{4+}$ and $Sn^{2+}$ may be added as a refining agent. A total content of these ions of more than 1 cat. % causes reduction in internal transmittance.

The glass of the present invention may include $Ta^{5+}$ in a proportion of 0 cat. % or more and 5 cat. % or less, together with $Sb^{3+}$, $Sn^{4+}$ and $Sn^{2+}$ in a proportion of 0 cat. % or more and 1 cat. % or less.

The glass of the present invention may include any one or more of $Y^{3+}$ and $Gd^{3+}$ in a proportion of the total content of 0 cat. % or more and 20 cat. % or less. A total content of these ions of more than 20 cat. % causes the glass to be unstabilized and results in crystal deposition.

The glass of the present invention may include any one or more of $Yb^{3+}$ and $Lu^{3+}$ in a proportion of the total content of 0 cat. % or more and 10 cat. % or less. A total content of these ions of more than 10 cat. % causes the glass to be unstabilized and results in crystal deposition.

The proportion of each the cationic components contained in the produced glass may be measured, for example, by inductively coupled plasma (ICP) emission spectroscopy.

The glass of the present invention may have a high refractive index nd for the d-line (587.56 nm) of 1.90 or more and 2.13 or less.

The glass of the present invention can have a content of $F^-$ in a proportion of 25 cat. % or less with respect the whole anion contained in the glass. $F^-$ in the glass is a useful element, having an effect for imparting low dispersion characteristics. No addition of $F^-$ is, however, preferred, since easy volatilization during melting causes difficulty in controlling the desired amount to remain in the glass.

The raw materials of the glass (glass materials) of the present invention may be selected from known materials such as oxides, hydrates, carbonates, nitrates and sulfates, which contain the cationic components, corresponding to conditions for manufacturing the glass.

(Optical Element)

The optical element of the present invention may be obtained by forming the above-described optical glass. In the specification, a element for constituting an optical apparatus such as a lens, a prism, a reflecting mirror or a diffraction grating, is referred to as an optical element.

(Method for Manufacturing Optical Glass)

The optical glass of the present invention may be manufactured by a containerless solidification method. More specifically in manufacturing, the sample is irradiated with laser such as carbon dioxide laser so as to be melted with a laser levitation furnace. The melt is then levitated by a fluid of levitating gas ejected from a nozzle, and cooled and solidified. The levitating gas for use may be properly selected from air, nitrogen, oxygen, an inert gas typified by argon, and dry air corresponding to an application. The flow rate of the levitating gas may be 200 to 1,000 ml/min in concert with the levitating of the fused material. The containerless solidification method is a method for producing glass by heat melting a material without use of a container of Pt alloy (Pt or platinum alloy such as Pt—Au and Pt—Au—Rh) and cooling and solidifying the material.

The containerless solidification method has two major features. The first feature is that a deep degree of cooling can be achieved, having no heterogeneous nucleation occurring at the interface between a fused material and a container, due to not using the container. The second feature is that a sample having a melting point higher than the melting point of a container itself (e.g. Pt: 1,768° C.) can be heat melted, due to not using the container.

The containerless solidification method mainly includes the steps of: preparing a glass material having a composition of the present invention; levitating the glass material; heat melting the glass material in a levitated state so as to produce a fused material; and cooling and solidifying the fused material in a levitated state.

In the step of preparing a glass material, the glass material having a composition of the present invention is prepared. In the step of levitating the glass material, the glass material may be levitated by magnetic levitation, electrostatic levitation, acoustic wave levitation, gas jet levitation, a combination of these (e.g. acoustic wave levitation and gas jet levitation), and levitation under microgravity (e.g. free fall and cosmic space). In the step of heat melting the glass material in a levitated state so as to produce a fused material, the glass material is heated at a temperature equal to or higher than the melting point, using a laser heating source typified by carbon dioxide gas laser, high-frequency heating source, a microwave heating source, or an image furnace for focusing heating with a halogen lamp as a heating source. In the step of cooling and solidifying the fused material in a levitated state, the fused material is cooled to a temperature equal to or lower than the melting point of the glass material so as to be solidified. In such a manufacturing method, the fused material is cooled and solidified at a cooling rate not causing crystallization from the fused material, so that a transparent glass sphere can be obtained.

EXAMPLES

The following Examples further illustrate the present invention.

In Examples 1 to 40, $B_2O_3$, $La_2O_3$, $Nb_2O_5$ and the like were weighed to a total amount of 10 g, such that the composition of the cationic components in the glass achieves the proportions in each sample shown in Table 1. In Table 1, data is represented in cation percentages.

Subsequently, the raw materials for glass synthesis were uniformly blended for 20 minutes with an agate mortar. In order to remove water content in the mixture, the mixture was fired at 600° C. for 7 hours in an electric furnace. The fired powder was loaded in a pressure rubber mold and then held under 20 kN for 1 minute by cold isostatic pressing. The produced rod-shaped powder (green compact) was fired at 1,200° C. for 7 hours to produce a sintered object 1. The sintered object 1 was set on a nozzle 3 of a gas jet levitating apparatus as illustrated in FIG. 1, so as to be levitated with oxygen gas 4 flowing from the nozzle hole at a rate of 500 ml/min. The sintered object 1 in a levitated state was irradiated with carbon dioxide gas laser 5 from above so as to be heated. After confirming the fully melted object levitated by oxygen gas, the laser output was cut off for rapid cooling. As a result, a transparent spherical sample 2 was obtained.

The produced spherical sample 2 was introduced in a forming mold having an upper mold, a lower mold, and a body mold which coaxially houses the upper and lower molds as a glass material, so that continuous molding of an optical element was performed. The upper mold is connected to a pressing shaft, so that the glass material placed in the lower mold can be press-molded by the vertical movement of the pressing shaft. A heater is built in the body mold, so that the temperature in the upper and lower molds can be controlled. An ultra-hard alloy mainly including tungsten carbide was selected as the mold material. The forming surface of the upper mold is processed to have a convex shape, while the forming surface of the lower mold is processed to have a concave shape, so that an optical element having a convex meniscus shape was formed. The target thickness of the center was 0.75 mm. The forming surface of the upper and lower molds was provided with an Ir-based alloy film by sputtering method.

In a state that the upper mold was sufficiently pulled up with the movement of the pressing shaft, the forming mold was heated with a heater. When the temperature of both the upper and lower molds reached 650° C., the glass material was arranged on the forming surface of the lower mold. Heating was continued until the temperature of the upper and lower molds reached 765° C. The temperature was held at 765° C. for 30 seconds, and then press-forming was performed by lowering the upper pressing shaft. After the upper mold came in contact with the glass material, the load was increased to 300 kg for 20 seconds. After an elapsed time of 20 seconds in the pressurized state, cooling was performed at a cooling rate of 60° C./min. Nitrogen gas was introduced in the upper and lower molds as a cooling means, so that the cooling rate was controlled by the flow rate. After the temperature of the upper and lower molds reached 620° C., the load of the upper pressing shaft was released. After the temperature reached 600° C., the formed glass was taken out. After the glass was taken out, the introduction of nitrogen gas was stopped and the forming mold was reheated. When the temperature of the upper and lower molds reached 650° C., a subsequent glass material was fed in. Under the same conditions, 5 shots of press forming were subsequently performed. Any of the pressed glass lenses has no defective appearance such as cracks, chippings, or haze.

In Comparative Examples 1 to 26, $B_2O_3$, $La_2O_3$, $Nb_2O_5$ and the like were weighed to a total amount of 10 g, such that the composition of cationic components in the glass achieves the proportion of each sample shown in Table 2, so that the sample 2 was obtained by the same operation. In Table 2, data are represented in cation percentages.

(Evaluation Method)

The sample 2 was then observed with an optical microscope (magnification factor: 100) for determination of presence or absence of crystals. When no crystal was observed in the observation of the transparent spherical sample 2 produced from the composition in Examples with the optical microscope, "good" is marked in the vitrification column in Table 1. The optical microscope observation results of the sample 2 produced from the composition in Comparative Examples are described in the vitrification column in Table 2.

(Measurement of Glass Transition Temperature, Refractive Index, and Abbe Number)

Also, the sample 2 was crushed with an agate mortar so as to be filled in a pan made of platinum having an outer diameter of 5 mm and a height of 2.5 m, which was then heated to 1,200° C. at a temperature increase rate of 10° C./min with a differential scanning calorimeter DSC 8270 made by Rigaku for detection of the glass transition temperature (Tg (° C.)). Two faces at right angles to each other were made by grinding, so that the refractive indexes for the g-line (435.83 nm), F-line (486.13 nm), d-line (587.56 nm), and C-line (656.27 nm) were measured with KPR-2000 made by Shimadzu Corporation. The Abbe number (νd) and the partial dispersion ratio (θgF) were obtained from the following formulae:

$$\nu d = (nd-1)/(nF-nC)$$

$$\theta gF = (ng-nF)/(nF-nC)$$

wherein nd, nF, nC, and ng represent refractive indexes for the d-line, F-line, C-line, and g-line, respectively.

In general, there exists a linear relationship between νd and θgF. In contrast, a so-called abnormal partial dispersion glass has a relationship deviated from the linear relationship and is used for eliminating secondary spectrum in a lens optical system.

In the case of a small sample, the transparent spherical sample was ground into a semispherical shape and then measured with an ellipsometer (M-2000F made by J. A. Woollam. Co., Inc).

The results for the produced transparent spherical sample 2 were described in Table 1. The results for the produced sample 2 in Comparative Examples by the same evaluation methods were shown in Table 2.

TABLE 1

| Example No. | Sample No. | $B^{3+}$ ($B_2O_3$) | $La^{3+}$ ($La_2O_3$) | $Nb^{5+}$ ($Nb_2O_5$) | $Y^{3+}$ ($Y_2O_3$) | $Gd^{3+}$ ($Gd_2O_3$) | $Yb^{3+}$ ($Yb_2O_3$) | $Lu^{3+}$ ($Lu_2O_3$) | $Si^{4+}$ ($SiO_2$) | $Ge^{4+}$ ($GeO_2$) | $Ta^{5+}$ ($Ta_2O_5$) | $Ti^{4+}$ ($TiO_2$) | $W^{6+}$ ($WO_3$) |
|---|---|---|---|---|---|---|---|---|---|---|---|---|---|
| 1 | 1 | 50 | 50 | 0 | | | | | | | | | |
| 2 | 2 | 50 | 40 | 10 | | | | | | | | | |
| 3 | 3 | 40 | 40 | 20 | | | | | | | | | |
| 4 | 4 | 30 | 40 | 30 | | | | | | | | | |
| 5 | 5 | 20 | 40 | 40 | | | | | | | | | |
| 6 | 6 | 40 | 50 | 10 | | | | | | | | | |
| 7 | 7 | 30 | 50 | 20 | | | | | | | | | |
| 8 | 8 | 20 | 50 | 30 | | | | | | | | | |
| 9 | 9 | 10 | 50 | 40 | | | | | | | | | |
| 10 | 10 | 40 | 60 | 0 | | | | | | | | | |
| 11 | 11 | 30 | 60 | 10 | | | | | | | | | |
| 12 | 12 | 25 | 60 | 15 | | | | | | | | | |
| 13 | 13 | 20 | 60 | 20 | | | | | | | | | |
| 14 | 14 | 10 | 60 | 30 | | | | | | | | | |
| 15 | 15 | 37 | 63 | 0 | | | | | | | | | |
| 16 | 16 | 30 | 65 | 5 | | | | | | | | | |
| 17 | 17 | 25 | 65 | 10 | | | | | | | | | |
| 18 | 18 | 20 | 65 | 15 | | | | | | | | | |
| 19 | 19 | 15 | 65 | 20 | | | | | | | | | |
| 20 | 20 | 30 | 50 | 10 | 10 | | | | | | | | |
| 21 | 21 | 30 | 40 | 10 | 20 | | | | | | | | |
| 22 | 22 | 30 | 50 | 10 | | 10 | | | | | | | |
| 23 | 23 | 30 | 40 | 10 | | 20 | | | | | | | |
| 24 | 24 | 30 | 50 | 10 | | | 10 | | | | | | |
| 25 | 25 | 30 | 50 | 10 | | | | 10 | | | | | |
| 26 | 26 | 30 | 60 | 5 | | | | | | | 5 | | |
| 27 | 27 | 27 | 54 | 9 | | | | | | | 10 | | |
| 28 | 28 | 30 | 60 | 0 | | | | | | | 10 | | |
| 29 | 29 | 28.57 | 57.14 | 4.76 | | | | | | | | 5 | |
| 30 | 30 | 28.57 | 57.14 | 4.76 | | | | | | | | | 5 |
| 31 | 31 | 28.57 | 57.14 | 4.76 | | | | | | | | | |
| 32 | 32 | 30 | 60 | 5 | | | | | | | | | |
| 33 | 33 | 27 | 54 | 9 | | | | | | | | | |
| 34 | 34 | 24 | 48 | 8 | | | | | | | | | |
| 35 | 35 | 28.5 | 57 | 9.5 | | | | | | | | | |
| 36 | 36 | 27 | 54 | 9 | | | | | | | | | |
| 37 | 37 | 27 | 54 | 9 | | | | | | | | | |
| 38 | 38 | 25 | 60 | 10 | | | | | 5 | | | | |
| 39 | 39 | 20 | 60 | 10 | | | | | 10 | | | | |
| 40 | 40 | 25 | 60 | 10 | | | | | | 5 | | | |

| Example No. | Sample No. | $Zr^{4+}$ ($ZrO_2$) | $Bi^{3+}$ ($Bi_2O_3$) | $Zn^{2+}$ (ZnO) | $Mg^{2+}$ (MgO) | $Ca^{2+}$ (CaO) | $Ba^{2+}$ (BaO) | Vitrification | Tg | nd | νd | θgF |
|---|---|---|---|---|---|---|---|---|---|---|---|---|
| 1 | 1 | | | | | | | good | 625 | 1.90035 | 40.42 | |
| 2 | 2 | | | | | | | good | 722 | 1.95663 | 36.16 | |
| 3 | 3 | | | | | | | good | 719 | 2.02777 | 31.35 | |
| 4 | 4 | | | | | | | good | 724 | 2.09891 | 26.54 | |
| 5 | 5 | | | | | | | good | 722 | 2.17005 | 21.73 | |
| 6 | 6 | | | | | | | good | 770 | 1.96781 | 35.61 | |
| 7 | 7 | | | | | | | good | 782 | 2.03895 | 30.80 | 0.591 |
| 8 | 8 | | | | | | | good | 814 | 2.11009 | 25.99 | |
| 9 | 9 | | | | | | | good | 846 | 2.18123 | 21.18 | |
| 10 | 10 | | | | | | | good | 728 | 1.90670 | 40.78 | |
| 11 | 11 | | | | | | | good | 780 | 1.97986 | 34.38 | 0.584 |
| 12 | 12 | | | | | | | good | 800 | 2.01500 | 32.32 | |
| 13 | 13 | | | | | | | good | 821 | 2.05013 | 30.25 | 0.592 |
| 14 | 14 | | | | | | | good | 863 | 2.12040 | 26.12 | |
| 15 | 15 | | | | | | | good | 612 | 1.90988 | 40.96 | |

TABLE 1-continued

| | | | | | | | | | | | good | 744 | 1.96214 | 35.79 | 0.58 |
|---|---|---|---|---|---|---|---|---|---|---|---|---|---|---|---|
| 16 | 16 | | | | | | | | | | good | 744 | 1.96214 | 35.79 | 0.58 |
| 17 | 17 | | | | | | | | | | good | 766 | 1.98313 | 34.56 | |
| 18 | 18 | | | | | | | | | | good | 787 | 2.00850 | 32.22 | |
| 19 | 19 | | | | | | | | | | good | 823 | 2.03328 | 30.98 | |
| 20 | 20 | | | | | | | | | | good | 782 | 1.97473 | 34.58 | 0.582 |
| 21 | 21 | | | | | | | | | | good | 790 | | | |
| 22 | 22 | | | | | | | | | | good | 782 | 1.98215 | 34.37 | 0.585 |
| 23 | 23 | | | | | | | | | | good | 791 | | | |
| 24 | 24 | | | | | | | | | | good | 782 | 1.97855 | 34.55 | 0.585 |
| 25 | 25 | | | | | | | | | | good | 783 | 1.97479 | 34.87 | 0.582 |
| 26 | 26 | | | | | | | | | | good | 787 | 1.98097 | 34.91 | 0.577 |
| 27 | 27 | | | | | | | | | | good | 827 | 2.00669 | 33.42 | 0.588 |
| 28 | 28 | | | | | | | | | | good | 795 | 1.98645 | 35.17 | 0.58 |
| 29 | 29 | | | | | | | | | | good | 757 | 1.97477 | 34.21 | 0.584 |
| 30 | 30 | | | | | | | | | | good | 786 | 1.99448 | 32.20 | 0.594 |
| 31 | 31 | 5 | | | | | | | | | good | 769 | | | |
| 32 | 32 | | 5 | | | | | | | | good | 770 | | | |
| 33 | 33 | | | 10 | | | | | | | good | 720 | 1.98087 | 33.67 | 0.586 |
| 34 | 34 | | | 20 | | | | | | | good | 661 | | | |
| 35 | 35 | | | | 5 | | | | | | good | 758 | | | |
| 36 | 36 | | | | | 10 | | | | | good | 728 | 1.96227 | 33.70 | 0.586 |
| 37 | 37 | | | | | | | 10 | | | good | 709 | 1.95377 | 33.74 | 0.584 |
| 38 | 38 | | | | | | | | | | good | 792 | | | |
| 39 | 39 | | | | | | | | | | good | 802 | | | |
| 40 | 40 | | | | | | | | | | good | 779 | 1.97759 | 34.19 | 0.585 |

The composition shown in Table 1 in the present Examples produced a transparent spherical sample, which had no crystal observable with an optical microscope even having a $La^3$ content of 40 cat. % or more, and of which glass transition temperature was confirmed by the measurement with a differential scanning calorimeter.

The refractive index for the d-line (587.56 nm) was as follows: Sample No. 10: 1.90670; Sample No. 26: 1.98097; and Sample No. 14: 2.12040; any of which was 1.90 or more. The Abbe number (vd) was as follows: Sample No. 10: 40.78; Sample No. 26: 34.91; and Sample No. 14: 26.12.

TABLE 2

| Comparative Example No. | Sample No. | $B^{3+}$ ($B_2O_3$) | $La^{3+}$ ($La_2O_3$) | $Nb^{5+}$ ($Nb_2O_5$) | $Y^{3+}$ ($Y_2O_3$) | $Gd^{3+}$ ($Gd_2O_3$) | $Yb^{3+}$ ($Yb_2O_3$) | $Lu^{3+}$ ($Lu_2O_3$) | $Si^{4+}$ ($SiO_2$) | $Ge^{4+}$ ($GeO_2$) | $Ta^{5+}$ ($Ta_2O_5$) | $Ti^{4+}$ ($TiO_2$) | $W^{6+}$ ($WO_3$) |
|---|---|---|---|---|---|---|---|---|---|---|---|---|---|
| 1 | Comparison-1 | 55 | 45 | 0 | | | | | | | | | |
| 2 | Comparison-2 | 60 | 40 | 0 | | | | | | | | | |
| 3 | Comparison-3 | 35 | 65 | 0 | | | | | | | | | |
| 4 | Comparison-4 | 60 | 30 | 10 | | | | | | | | | |
| 5 | Comparison-5 | 50 | 30 | 20 | | | | | | | | | |
| 6 | Comparison-6 | 10 | 40 | 50 | | | | | | | | | |
| 7 | Comparison-7 | 0 | 50 | 50 | | | | | | | | | |
| 8 | Comparison-8 | 5 | 65 | 30 | | | | | | | | | |
| 9 | Comparison-9 | 10 | 70 | 20 | | | | | | | | | |
| 10 | Comparison-10 | 20 | 70 | 10 | | | | | | | | | |
| 11 | Comparison-11 | 30 | 70 | 0 | | | | | | | | | |
| 12 | Comparison-12 | 30 | 30 | 10 | 30 | | | | | | | | |
| 13 | Comparison-13 | 30 | 30 | 10 | | 30 | | | | | | | |
| 14 | Comparison-14 | 30 | 30 | 10 | | | 20 | | | | | | |
| 15 | Comparison-15 | 30 | 30 | 10 | | | | 20 | | | | | |
| 16 | Comparison-16 | 25.5 | 51 | 8.5 | | | | | | | 15 | | |
| 17 | Comparison-17 | 27 | 54 | 9 | | | | | | | | 10 | |
| 18 | Comparison-18 | 27 | 54 | 9 | | | | | | | | | 10 |
| 19 | Comparison-19 | 27 | 54 | 9 | | | | | | | | | |
| 20 | Comparison-20 | 15 | 60 | 10 | | | | | 15 | | | | |
| 21 | Comparison-21 | 20 | 60 | 10 | | | | | | 10 | | | |
| 22 | Comparison-22 | 21 | 42 | 7 | | | | | | | | | |
| 23 | Comparison-23 | 27 | 54 | 9 | | | | | | | | | |
| 24 | Comparison-24 | 24 | 48 | 8 | | | | | | | | | |
| 25 | Comparison-25 | 24 | 48 | 8 | | | | | | | | | |
| 26 | Comparison-26 | 70 | 30 | 0 | | | | | | | | | |

| Comparative Example No. | Sample No. | $Zr^{4+}$ ($ZrO_2$) | $Bi^{3+}$ ($Bi_2O_3$) | $Zn^{2+}$ (ZnO) | $Mg^{2+}$ (MgO) | $Ca^{2+}$ (CaO) | $Ba^{2+}$ (BaO) | Total amount of ($B^{3+}$ + $La^{3+}$ + $Nb^{5+}$) | $La^{3+}$ content | Total amount of rare earths | Vitrification | Tg |
|---|---|---|---|---|---|---|---|---|---|---|---|---|
| 1 | Comparison-1 | | | | | | | 100 | 45 | 45 | Devitrified | — |
| 2 | Comparison-2 | | | | | | | 100 | 40 | 40 | Devitrified | — |
| 3 | Comparison-3 | | | | | | | 100 | 65 | 65 | Devitrified | — |
| 4 | Comparison-4 | | | | | | | 100 | 30 | 30 | Inner fine bubble | 659 |

TABLE 2-continued

| | | | | | | | | |
|---|---|---|---|---|---|---|---|---|
| 5 | Comparison-5 | | | | 100 | 30 | 30 | Inner fine bubble | 667 |
| 6 | Comparison-6 | | | | 100 | 40 | 40 | Devitrified | — |
| 7 | Comparison-7 | | | | 100 | 50 | 50 | Devitrified | — |
| 8 | Comparison-8 | | | | 100 | 65 | 65 | Devitrified | — |
| 9 | Comparison-9 | | | | 100 | 70 | 70 | Devitrified | — |
| 10 | Comparison-10 | | | | 100 | 70 | 70 | Devitrified | — |
| 11 | Comparison-11 | | | | 100 | 70 | 70 | Devitrified | — |
| 12 | Comparison-12 | | | | 70 | 30 | 60 | Devitrified | — |
| 13 | Comparison-13 | | | | 70 | 30 | 60 | Partially devitrified | 794 |
| 14 | Comparison-14 | | | | 70 | 30 | 50 | Devitrified | — |
| 15 | Comparison-15 | | | | 70 | 30 | 50 | Devitrified | — |
| 16 | Comparison-16 | | | | 85 | 51 | 51 | Devitrified | — |
| 17 | Comparison-17 | | | | 90 | 54 | 54 | Devitrified | — |
| 18 | Comparison-18 | | | | 90 | 54 | 54 | Devitrified | — |
| 19 | Comparison-19 | 10 | | | 90 | 54 | 54 | Devitrified | — |
| 20 | Comparison-20 | | | | 85 | 60 | 60 | Devitrified | — |
| 21 | Comparison-21 | | | | 90 | 60 | 60 | Devitrified | — |
| 22 | Comparison-22 | | 30 | | 70 | 42 | 42 | Partially devitrified | 643 |
| 23 | Comparison-23 | | | 10 | 90 | 54 | 54 | Devitrified | — |
| 24 | Comparison-24 | | | 20 | 80 | 48 | 48 | Devitrified | — |
| 25 | Comparison-25 | | | 20 | 80 | 48 | 48 | Devitrified | — |
| 26 | Comparison-26 | | | | 100 | 30 | 30 | Surface-devitrified | — |

The compositions in Comparative Examples shown in Table 2 are out of the range in the ternary phase diagram of $B_2O_3$, $La_2O_3$, $Nb_2O_5$ represented in cation percentages. In Comparative Examples 4 and 5, fine bubbles were generated in the sample. In Comparative Examples 1 to 3, and 6 to 26, no transparent sample was obtained due to devitrification of glass.

Figure 2:
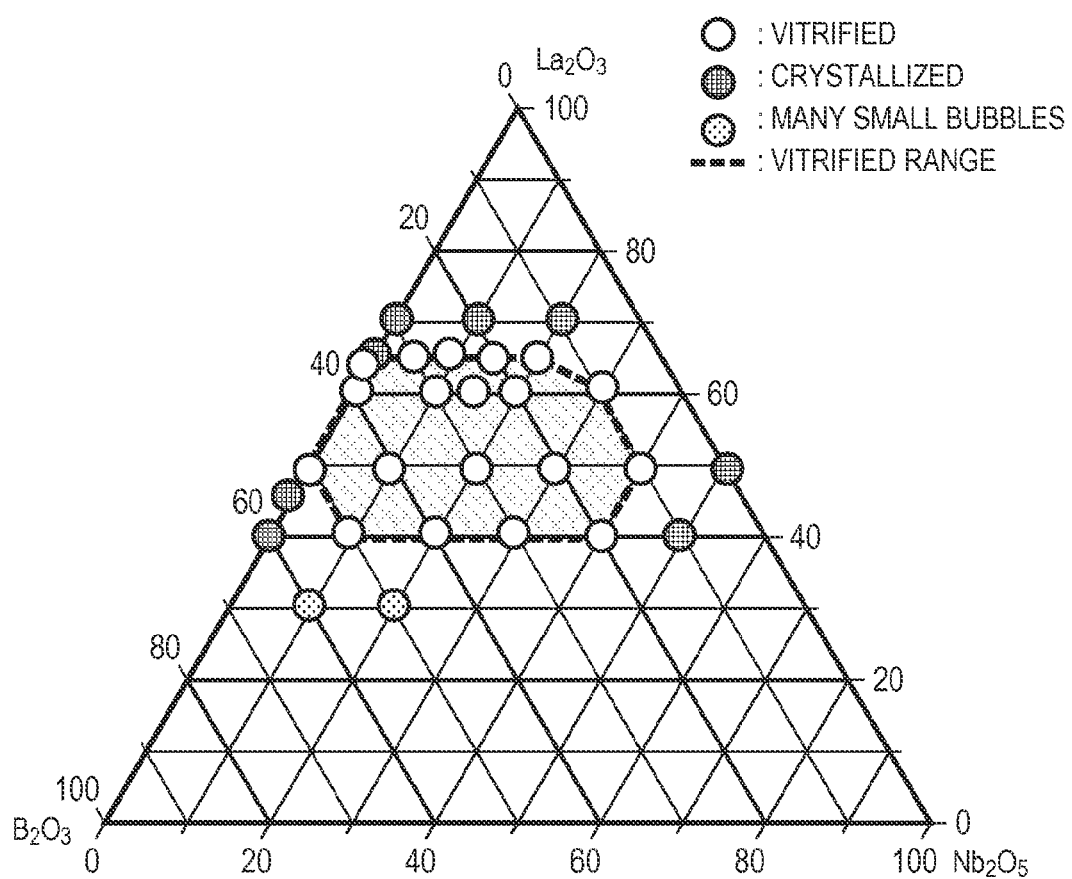
FIG. 2 is a ternary phase diagram of $B_2O_3$—$La_2O_3$—$Nb_2O_5$ illustrating a vitrified range in Examples.

Among the present Examples and Comparative Example, typical compositions are plotted in the ternary phase diagram of $B_2O_3$—$La_2O_3$—$Nb_2O_5$ as illustrated in FIG. 2:
In the range surrounded by Sample No. 1 ($B_2O_3$:$La_2O_3$:$Nb_2O_5$=50:50:0), Sample No. 2 ($B_2O_3$:$La_2O_3$:$Nb_2O_5$=50:40:10), Sample No. 5 ($B_2O_3$:$La_2O_3$:$Nb_2O_5$=20:40:40), Sample No. 9 ($B_2O_3$:$La_2O_3$:$Nb_2O_5$=10:50:40), Sample No. 14 ($B_2O_3$:$La_2O_3$:$Nb_2O_5$=10:60:30), Sample No. 19 ($B_2O_3$:$La_2O_3$:$Nb_2O_5$=15:65:20), Sample No. 16 ($B_2O_3$:$La_2O_3$:$Nb_2O_5$=30:65:5), Sample No. 15 ($B_2O_3$:$La_2O_3$:$Nb_2O_5$=37:63:0), and Sample No. 10 ($B_2O_3$:$La_2O_3$:$Nb_2O_5$=40:60:0), vitrification was achieved.

In order to inspect the abundance of ring structures (linking degree of network formers), molecular dynamics calculation was performed based on measurement results of X-ray diffraction and NMR analysis for Comparative Example No. 26 (70$B_2O_3$—30$La_2O_3$), Example No. 10 (40$B_2O_3$—$La_2O_3$), and Example No. 11 (30$B_2O_3$—60$La_2O_3$—10$Nb_2O_5$).

The X-ray diffraction was performed with a Rint 2000 (Mo, 2θ/θ scan) made by Rigaku, so that the total correlation function was obtained. The NMR analysis was performed with a JNM-ECA 500 made by JEOL (nuclide: 11B, magnetic field: 500 MHz (11.74 T), cpMAS method), so that the coordination number of B was obtained.

In the molecular dynamics calculation (hereinafter referred to as MD calculation), atoms were randomly arranged to become equal to the measured values of the glass as an initial arrangement, so that the calculation was performed at 1 fs intervals for 20,000 steps at a temperature of 4,000 K, for 100,000 steps from 4,000 K to 293 K, and for 20,000 steps at 293 K, in a fixed MD cell. A pair correlation function was calculated from the atomic arrangement in the final step, so that the total X-ray correlation function was calculated from the pair correlation function.

Here, the pair correlation function is defined as follows:

Pair correlation function;

$$g_{ij}(r) = \frac{V}{N_i N_j} \sum_{k}^{N_j} \frac{n_{ij}\left(r - \frac{\Delta r}{2}, r + \Delta r/2\right)}{4\pi r^2 \Delta r}$$

V: volume;
Ni and Nj: total number of atoms of i-th and j-th atomic species;
nkj: number of atoms of j-th atomic species included in a spherical shell having a thickness $\Delta r$ at a position at a distance r from k-th atom.

The electric charges Zi and Zj and the coefficients Bij and ρij of the Born-Mayer potential were adjusted, such that the total X-ray correlation function obtained from the MD calculation results reproduces the total X-ray correlation function measured by X-ray diffraction.

Born-Mayer potential;

$$\Phi(r_{ij}) = \frac{Z_i Z_j e^2}{4\pi\varepsilon_0} + B_{ij} e^{-r_{ij}/\rho_{ij}}$$

i and j: atomic numbers, i, j≤N (N: number of atoms in a model)
$Z_i$ and $Z_j$: electric charges of i-th and j-th atoms
e: electric charge elementary quantity
$\varepsilon_0$: permittivity of vacuum
$r_{ij}$: distance between i-th and j-th atoms
$B_{ij}$ and $\rho_{ij}$: parameters of Born-Mayer potential of a pair of i-th to j-th atoms When the total X-ray correlation function was sufficiently reproduced, it was assumed that the MD calculation results reproduced the actual atomic arrangement of the glass.

The coordination number was obtained by the following method.

After the total X-ray correlation function was sufficiently reproduced, the pair correlation function g (r) of B—O was calculated from the atomic arrangement obtained by the MD calculation using the potential. Subsequently, the pair correlation function g (r) was integrated to calculate the cumulative coordination number N (r).

Cumulative coordination number, $$N_{ij}(r) = \frac{N_j}{V} \sum_{n=0}^{\frac{r}{\Delta r}} g_{ij}(n\Delta r)$$

The pair correlation function g (r) steeply rises from 1.2 Å, reaches peak at 1.35 Å, then falls down to approximately zero at 1.7 Å, and gradually rises from 2.3 Å. This indicates that a first proximity peak exists in the range from 1.2 Å to 1.7 Å and a second proximity peak and more peaks exist at 2.3 Å or farther. In this instance, the first proximity was assumed to be in the range up to 2.0 Å, i.e. the middle point between 1.7 Å and 2.3 Å, so that the value of the cumulative coordination number N (r) at a distance of 2.0 Å was assumed to be the coordination number of B—O.

From the structural analysis, the average coordination number of oxygen ion and boron ion (B—O coordination number) was calculated to be 1.51 in Comparative Example No. 26, 0.81 in Example No. 10, and 0.57 in Example No. 11. Furthermore, the average coordination number of oxygen ion and niobium ion (O—Nb coordination number) was 0.37 in Example No. 11 ($30B_2O_3$—$60La_2O_3$—$10Nb_2O_5$), in the same way. It was found that a stable glass was obtained in the present invention, even having a short network structure.

Furthermore, the ring structures in Comparative Example 26 ($70B_2O_3$—$30La_2O_3$) and in Example No. 10 ($40B_2O_3$—$60La_2O_3$) were calculated.

The ring structure was calculated by the following method.

One B atom was firstly observed. An O atom located within a distance of 2.0 Å or less from the B atom was then searched. Subsequently, a B atom within a distance of 2.0 Å or less from the O atom was searched. By repeating this, the number of atoms for return to the original B atom was assumed to be the number of ring members. This processing was performed for all the combinations so as to obtain the distribution of the number of ring members.

The mode value was $B_5O_5$ in Comparative Example 26 ($70B_2O_3$—$30La_2O_3$), and $B_2O_2$ in Example No. 10 ($40B_2O_3$—$60La_2O_3$). It is believed from the result that the glass structure in the composition range of the present invention has less nonbridging oxygens compared to a conventional glass, allowing $B_2O_3$ to have weak network forming ability, so that a part of the O—Nb or O—La coordination functions as a network structure constituent.

INDUSTRIAL APPLICABILITY

The glass having a composition of the present invention may be formed into an optical element so as to be used, for example, as an optical pickup lens for a camera, a digital camera, a VTR, a DVD, or the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-046908, filed Mar. 8, 2013, which is hereby incorporated by reference herein in its entirety.

What is claimed is:

1. An optical glass comprising $B^{3+}$, $La^{3+}$ and $Nb^{5+}$ as cationic components constituting the glass, wherein the optical glass satisfies the following expressions represented in cation percentages:

10 cat. %≤$B^{3+}$≤50 cat. %;
40 cat. %≤$La^{3+}$≤65 cat. %;
0 cat. %≤$Nb^{5+}$≤40 cat. %;
80 cat. %≤(total amount of $B^{3+}$+$La^{3+}$+$Nb^{5+}$)≤100 cat. %; and
0 cat. %≤$Si^{4+}$≤10 cat. %;
0 cat. %≤$Ge^{4+}$≤5 cat. %;
0 cat. %≤$Mg^{2+}$≤5 cat. %;
0 cat. %≤$Ba^{2+}$≤10 cat. %;
0 cat. %≤$Ca^{2+}$≤10 cat. %;
0 cat. %≤$Sr^{2+}$≤10 cat. %;
0 cat. %≤$Zn^{2+}$≤20 cat. %;
0 cat. %≤$W^{6+}$≤5 cat. %;
0 cat. %≤$Zr^{4+}$≤5 cat. %;
0 cat. %≤$Ti^{4+}$≤5 cat. %;
0 cat. %≤$Bi^{3+}$≤5 cat. %;
0 cat. %≤$Ta^{5+}$≤10 cat. %;
0 cat. %≤(total amount of $Y^{3+}$+$Gd^{3+}$)≤20 cat. %; and
0 cat. %≤(total amount of $Yb^{3+}$+$Lu^{3+}$)≤10 cat. %.

2. The optical glass according to claim 1, wherein the proportions with respect to the whole cationic components contained in the glass are as follows:

0 cat. %≤$Ta^{5+}$≤5 cat. %;
0 cat. %≤$Sb^{3+}$≤1 cat. %;
0 cat. %≤$Sn^{4+}$≤1 cat. %; and
0 cat. %≤$Sn^{2+}$≤1 cat. %.

3. The optical glass according to claim 1, wherein the glass has a refractive index nd for the d-line (587.56 nm) of 1.90 or more and 2.13 or less.

4. The optical glass according to claim 1, wherein the proportions of cationic components of the glass satisfy the following expressions:

$La^{3+}$/2≤($B^{3+}$+$Nb^{5+}$); and
4.8 cat. %≤$Nb^{5+}$.

5. The optical glass according to claim 1, wherein the proportions of cationic components of the glass satisfy the following expressions:

$B^{3+}$≤$La^{3+}$; and
4.8 cat. %≤$Nb^5$.

6. The optical glass according to claim 1, wherein the proportions of cationic components of the glass satisfy the following expression:

50 cat. %≤$La^{3+}$≤65 cat. %.

7. The optical glass according to claim 1, wherein the proportions of cationic components of the glass satisfy the following expression:

54 cat. %≤$La^{3+}$≤65 cat. %.

8. An optical glass comprising $B^{3+}$ and $La^{3+}$ as cationic components constituting the glass, wherein the optical glass satisfies the following expressions represented in cation percentages:

10 cat. %≤$B^{3+}$≤50 cat. %;
40 cat. %≤$La^{3+}$≤63 cat. %;
0 cat. %=$Nb^{5+}$;
0 cat. %≤$Si^{4+}$≤10 cat. %;
0 cat. %≤$Ge^{4+}$≤5 cat. %;
0 cat. %≤$Mg^{2+}$≤5 cat. %;
0 cat. %≤$Ba^{2+}$≤10 cat. %;
0 cat. %≤$Ca^{2+}$≤10 cat. %;
0 cat. %≤$Sr^{2+}$≤10 cat. %;
0 cat. %≤$Zn^{2+}$≤20 cat. %;
0 cat. %≤$W^{6+}$≤5 cat. %;

0 cat. % ≤ $Zr^{4+}$ ≤ 5 cat. %;
0 cat. % ≤ $Ti^{4+}$ ≤ 5 cat. %;
0 cat. % ≤ $Bi^{3+}$ ≤ 5 cat. %;
0 cat. % ≤ $Ta^{5+}$ ≤ 10 cat. %;
0 cat. % ≤ (total amount of $Y^{3+}$+$Gd^{3+}$) ≤ 20 cat. %; and
0 cat. % ≤ (total amount of $Yb^{3+}$+$Lu^{3+}$) ≤ 10 cat. %.

9. An optical glass comprising $B^{3+}$ and $La^{3+}$ as cationic components constituting the glass, wherein the proportions of $B^{3+}$, $La^{3+}$ and $Nb^{5+}$ are included in a region surrounded by the points represented by (50:50:0), (50:40:10), (20:40:40), (10:50:40), (10:60:30), (15:65:20), (30:65:5), (37:63:0) and (40:60:0) in the ternary phase diagram of $B_2O_3$—$La_2O_3$—$Nb_2O_5$.

10. An optical element formed from the glass according to claim 1.

11. A method for manufacturing the optical glass according to claim 1 comprising melting a glass raw material with laser levitation furnace, and levitating the melt with a levitating gas and cooling.

* * * * *